United States Patent [19]
Juri et al.

[11] Patent Number: 5,117,381
[45] Date of Patent: May 26, 1992

[54] DISCRETE ORTHOGONAL AND INVERSE ORTHOGONAL TRANSFORM APPARATUS

[75] Inventors: Tatsuro Juri, Osaka; Shinya Kadono, Hirakata, both of Japan

[73] Assignee: Matsushita Electric Industrial Co., Ltd., Osaka, Japan

[21] Appl. No.: 739,106

[22] Filed: Aug. 1, 1991

Related U.S. Application Data

[63] Continuation-in-part of Ser. No. 425,108, Oct. 23, 1989.

[30] Foreign Application Priority Data

Oct. 27, 1988 [JP] Japan .................................. 63-271179
Oct. 27, 1988 [JP] Japan .................................. 63-271180

[51] Int. Cl.$^5$ ............................................... G06F 7/38
[52] U.S. Cl. ................................................... 364/725
[58] Field of Search .................................. 364/725, 726

[56] References Cited

U.S. PATENT DOCUMENTS

| | | | |
|---|---|---|---|
| 4,385,363 | 5/1983 | Widergren et al. | 364/725 |
| 4,679,163 | 7/1987 | Arnould et al. | 364/725 |
| 4,841,464 | 6/1989 | Guichard et al. | 364/725 |
| 4,873,658 | 10/1989 | Lambonie | 364/725 |

Primary Examiner—Tan V. Mai
Attorney, Agent, or Firm—Stevens, Davis, Miller & Mosher

[57] ABSTRACT

Eight point Discrete Cosine Transform (DCT) and eight point DCT can be calculated by not more than 8 multiplications by performing a given weighting for each component of orthogonal transformation of DCT and inverse DCT. An orthogonal transformation apparatus can be implemented by one multiplication unit, one addition unit or substraction unit, three butterfly operation units, several resequence units, delay units and selector unit by using one multiplication unit which is capable of one multiplication per one sample on a time-sharing basis.

8 Claims, 12 Drawing Sheets

FDCT $C_i = \cos(i \cdot \pi / 16)$

FIDCT $C_i = \cos(i \cdot \pi / 16)$ $C_i = \cos(i \cdot \pi/16)$

DCT

IDCT

DISCRETE ORTHOGONAL AND INVERSE ORTHOGONAL TRANSFORM APPARATUS

CROSS REFERENCE TO RELATED APPLICATION

This application is a continuation-in-part of application Ser. No. 425,108 filed Oct. 23, 1989, and assigned to the assignee of this application.

BACKGROUND OF THE INVENTION

The present invention relates to orthogonal transform technique used for image processing.

Digitizing images or audio signals makes high efficiency coding technique more important. As an effective means for high efficiency coding, there is known orthogonal transform coding. Discrete Cosine Transform (DCT) in particular is suitable for high efficiency coding and is used commonly. The calculation formulas for normalized (with the same weighting given to each orthogonal coefficient) eighth order DCT are shown in the following, where $X0, ..., X7$ in the formulas (1) to (7) represent the sampled input values, $Y0, ..., Y7$ represent the orthogonally transformed output values, and $Ci$ ($i=1, ..., 7$) takes a value $COS(i\pi/16)$.

$$Y0 = C4X0 + C4X1 + C4X2 + C4X3 + C4X4 + C4X5 + C4X6 + C4X7 \quad (1)$$

$$Y1 = C1X0 + C3X1 + C5X2 + C7X3 - C7X4 - C5X5 - C3X6 - C1X7 \quad (2)$$

$$Y2 = C2X0 + C6X1 - C6X2 - C2X3 - C2X4 - C6X5 + C6X6 + C2X7 \quad (3)$$

$$Y3 = C3X0 - C7X1 - C1X2 - C5X3 + C5X4 + C1X5 + C7X6 - C3X7 \quad (4)$$

$$Y4 = C4X0 - C4X1 - C4X2 + C4X3 + C4X4 - C4X5 - C4X6 + C4X7 \quad (5)$$

$$Y5 = C5X0 - C1X1 + C7X2 + C3X3 - C3X4 - C7X5 + C1X6 - C5X7 \quad (6)$$

$$Y6 = C6X0 - C2X1 + C2X2 - C6X3 - C6X4 + C2X5 - C2X6 + C6X7 \quad (7)$$

$$Y7 = C7X0 - C5X1 + C3X2 - C1X3 + C1X4 - C3X5 + C5X6 - C7X7 \quad (8)$$

An actual apparatus realizing an eighth order DCT on the basis of the above formulas is shown in FIG. 10. $X0, ..., X7$ shown in FIG. 10 are eight inputs to the apparatus, and $Y0, ..., Y7$ are eight outputs therefrom. Each orthogonal coefficient $Yi$ has a higher frequency component the larger the suffix number is. $Ci$ ($i=1, ..., 7$) is a multiplier for multiplying each sampled input by $Ci$. An intersection between two arrows indicates an addition of two values inputted along the two arrows. With the apparatus shown in FIG. 10, the input values $X0, ..., X7$ are transformed into orthogonal coefficients $Y0, ..., Y7$. This DCT apparatus requires as many multiplications as 64 times, thereby resulting in a large hardware scale. In view of this, a fast algorithm for reducing the number of multiplications has been presented. FIG. 11 shows an example of an eighth order Fast DCT (FDCT) apparatus. A broken line in FIG. 11 indicates an inversion of plus/minus sign. In the example shown in FIG. 11, FDCT is realized by three stages of butterfly operation (operation of calculating $(a+b)$, $(a-b)$ for the inputs $a, b$), reducing the number of multiplications to 12 times. FIG. 12 shows an example of a Fast Inverse DCT (FIDCT). The number of multiplications in this FIDCT is also reduced to 12 times. The above fast algorithm is also applicable to Discrete Sine Transform (DST).

Apart from the above description, human visual sense or acoustic sense is generally more insensitive to distortions of high frequency components than low frequency components. In high efficiency coding, therefore, it often occurs the case where a large weighting is given to the orthogonal coefficient for low frequency range, whereas a small weighting is given to the orthogona coefficient for high frequency. For this reason, multiplication for weighting each orthogonal coefficient is generally carried out after the execution of DCT. This is illustrated in FIG. 13 wherein of eight orthogonal coefficient outputs from an eighth order DCT apparatus, seven outputs are weighted by multiplying them by constants $W1, ..., W7$. As will be understood, weighting for N orthogonal coefficients generally requires multiplication of $(N-1)$ times.

Further, in conventional FDCT or FDST, $N (=2_m)$-th order orthogonal transform or inverse orthogonal transform requires multiplication as many as $m \times 2^{m-1}$ times at a minimum. It is therefore necessary for real time image processing to perform considerably fast multiplication. In addition, if weighting is necessary, additional multiplications are required to thereby make it more difficult to realize an actual apparatus. For example, consider the case of two-dimensional (8×8) DCT for an image block composed of horizontal 8 pixels and vertical 8 pixels, 64 pixels in total. It requires multiplications $12 \times 8$ times in the horizontal direction and $12 \times 8$ times in the vertical direction, totaling 192 multiplications. If 64 pixels are weighted after two-dimensional DCT, additional 63 multiplications are required, resulting in the number of multiplications of 255 times.

In a conventional example shown in FIG. 11, in calculating one orthogonal coefficient, multiplication is serially performed $m (=3)$ times at a maximum. If multiplication for weighting is included, the total 4 multiplications are serially performed. There arises another problem of rounding errors caused by repetitive multiplications.

As described before, human visual sense is relatively insensitive to high frequency distorsions. An orthogonal coefficient for low frequency is therefore necessary to have a higher precision than that for high frequency. However, in a conventional example of FDCT shown in FIG. 11, the final multiplication for each orthogonal coefficient has a larger multiplier the lower the frequency component for the orthogonal coefficient is. Accordingly, before the final multiplication, the higher the frequency component for the orthogonal coefficient is, it has a higher precision. In the example shown in FIG. 11, the precision of the first coefficient (Y1) relative to the seventh coefficient (Y7) before the final multiplication is:

$$\begin{aligned} C7/C1 &= COS(7\pi/16)/COS(\pi/16) \\ &= \text{about } 1/5 \end{aligned}$$

Accordingly, the orthogonal coefficient for low frequency which takes an important role from the standpoint of visual sense, has larger operation errors.

SUMMARY OF THE INVENTION

It is an object of the present invention to solve the above problems associated with the conventional technique, and provide an orthogonal and inverse orthogonal transform apparatus capable of being easily realized by reducing the number of multiplications and multiplier devices, while making operation errors to be caused by multiplications small.

The above object of the present invention is achieved by the provision of an orthogonal transform apparatus wherein in N-th order DCT (Discrete Cosine Transform) or DST (Discrete Sine Transform), the multiplier (coefficient) used for weighting N orthogonal coefficients Yi (where $0 \leq i < N$) in N-th order orthogonal transform is one of, a combination of two or more of, or a multiple of one of, the following four sets:

. COS (i/2N)
. SIN (i/2N)
. 1/COS (i/2N)
. 1/SIN (i/2N)

It is therefore possible to considerably reduce the number of multiplications as compared with conventional orthogonal transform.

The present invention also provides an inverse orthogonal transform apparatus wherein in N-th order IDCT (Inverse Discrete Cosine Transform) or IDST (Inverse Discrete Sine Transform), the multiplier (coefficient) used for weighting N orthogonal coefficients Yi (where $0 \leq i < N$) in N-th order inverse orthogonal transform is one of, a combination of two or more of, or a multiple of one of, the following four sets:

. COS (i/2N)
. SIN (i/2N)
. 1/COS (i/2N)
. 1/SIN (i/2N) It is therefore possible to considerably reduce the number of multiplications as compared with conventional inverse orthogonal transform.

The present invention further provides an orthogonal transform apparatus wherein there are carried out N/2 sets of butterfly operations in $\log_2(N)$ stages, and addition, subtraction or multiplication operation with respect to each butterfly operation, in N-th order DCT (Discrete Cosine Transform) or DST (Discrete Sine Transform).

The present invention also provides an inverse orthogonal transform apparatus wherein there are carried out N/2 sets of butterfly operations in log2(N) stages, and addition, subtraction or multiplication operation, in N-th order IDCT (Indirect Discrete Cosine Transform) or IDST (Indirect Discrete Sine Transform).

The present invention further provides an orthogonal transform apparatus comprising eight inputs (X0, X1, X2, X3, X4, X5, X6, X7) supplied to the apparatus; first butterfly operation means for obtaining (A0, A1, A2, A3, A4, A5, A6, A7) given by:

A0 = X0 + X7
A1 = X1 + X6
A2 = X2 + X5
A3 = X3 + X4
A4 = X0 − X7
A5 = X1 − X6
A6 = X2 − X5
A7 = X3 − X4 second butterfly operation means for obtaining (B0, B1, B2, B3, B4, B5, B6, B7) given by:

B0 = A0 + A3
B1 = A1 + A2
B2 = A0 − A3
B3 = A1 − A2
B4 = A4 + C4 (A5 + A6)
B5 = A5 + C4 (A4 + A7)
B6 = A4 − C4 (A5 + A6)
B7 = A5 − C4 (A4 + A7)

and third butterfly operation means for obtaining DCT-ed orthogonal coefficients (Z0, Z1, Z2, Z3, Z4, Z5, Z6, Z7) given by:

Z0 = B0 + B1
Z4 = B0 − B1
Z2 = B2 + C4 (B2 + B3)
Z6 = B2 − C4 (B2 + B3)
Z1 = B4 + 2C4C6 (B4 + B5)
Z7 = B4 − 2C4C6 (B4 + B5)
Z3 = B6 + 2C4C6 (B6 + B7)
Z5 = B6 − 2C2C4 (B6 + B7)

An eighth order DCT can thus be realized by multiplications of five times.

The present invention also provides an orthogonal transform apparatus wherein weighting in orthogonal transform is 9reater for an orthogonal coefficient for low frequency than for high frequency. It is therefore possible to process at a low distortion level the low frequency component which takes an important role from the standpoint of visual sense.

The present invention further provides an orthogonal transform apparatus wherein two-dimensional DCT or DST, the multiplier (coefficient) used for weighting N orthogonal coefficients Yi (where $0 \leq i < N$) in N-th order orthogonal or inverse orthogonal transform is one of, a combination of two or more of, or a multiple of one of, the following four sets:

. COS (i/2N)
. SIN (i/2N)
. 1/COS (i/2N)
. 1/SIN (i/2N) and wherein each orthogonal coefficient after the two-dimensional orthogonal transform is subjected to two-dimensional weighting, to thereby reduce the number of multiplications and multiplier devices and perform a desired weighting.

Use of the orthogonal and inverse orthogonal transform apparatus of this invention enables to reduce the number of multiplications to the number smaller than one half the conventional, thereby considerably reducing hardware necessary for orthogonal transform. In addition, the number of multiplications serially performed in calculating each orthogonal coefficient is also reduced, so that operation errors to be caused by repetitive multiplications can be suppressed minimum. Further, if the orthogonal transform apparatus of this invention is applied to the two-dimensional orthogonal transform apparatus, it is also possible to reduce the number of multiplications irrespective of whether optional weighting is carried out or not. According to this invention, therefore, an image bandwidth compression apparatus using orthogonal transform such as DCT can be realized in a small circuit scale, providing great practical advantages.

In order to implement the above-mentioned inventive concepts, the present invention provides an orthogonal transformation apparatus for orthogonally transforming an input signal comprising a set of digitalized 8 data into an output signal comprising data, each having as a base each component of eight point cosine transformation; comprising; a first resequence unit for resequencing the order of the set of input signals into a predetermined order; a first butterfly operation unit for performing a butterfly operation which is an addition and subtraction between data separated by a predetermined sample of an output of said first resequence unit; a second resequence unit for resequencing the order of the output of said first butterfly operation unit; a first delay unit for delaying an output of said second resequence unit by a predetermined period of time; a first selector unit for selecting one of three outputs from said first delay unit, a multiplication unit and an addition unit in a predetermined order; a second butterfly operation unit for performing a butterfly operation for the output of said first selector; a third resequence unit for resequencing the order of the output of said second butterfly operation unit; a second delay unit for delaying an output of said third resequence unit by a predetermined period of time; a second selector unit for selecting one of three outputs from said second delay unit, said multiplication unit and said addition unit; a third butterfly operation unit for performing a butterfly operation for an output of said second selector; a third delay unit for delaying an output of said third butterfly operation unit by a predetermined period of time; a third selector unit for selecting one of two outputs from said third delay unit and said multiplication unit in a predetermined order; a fourth resequence unit for resequencing the order of output of said third selector into a predetermined order to output an orthogonal transformed signal; a fourth selector unit for selecting one of three outputs from said second and third resequence units, and said third butterfly operation unit in a predetermined order; said multiplication unit being adapted to multiply an output of said fourth selector by a multiplier selected in a predetermined order; a fifth selector unit for selecting a set of data from two outputs from said second and third resequence units in a predetermined order; and said addition unit being adapted to perform addition for an output of said fifth selector, an orthogonal transformation apparatus for orthogonally transforming an input signal comprising a set of 8 digitalized data into an output signal comprising data each having as a base each component of 8 point inverse cosine transformation comprising; a first resequence unit for resequencing the order of the input signal of said one set of data into a predetermined order; a first delay unit for delaying an output of said first resequence unit by a predetermined period of time; a first selector unit for selecting one of two outputs of said first delay unit and a multiplication unit in a predetermined order; a first butterfly operation unit for performing a butterfly operation which is an addition and subtraction operation between data separated by a predetermined sample of an output of said first selector unit; a second resequence unit for resequencing the order of an output of said first butterfly operation unit into a predetermined order; a second delay unit for delaying an output of said second resequence unit by a predetermined period of time; a second selector unit for selecting one of three outputs from said second delay unit, said multiplication unit and a subtraction unit in a predetermined order; a second butterfly unit for performing a butterfly operation for an output of said selector unit; a third resequence unit for resequencing the order of said second butterfly operation unit into a predetermined order; a third delay unit for delaying an output of said third resequence unit by a predetermined period of time; a third selector unit for selecting one of three outputs from said third delay unit, said multiplication unit and said subtraction unit in a predetermined order; a third butterfly operation unit for performing a butterfly operation for an output of said third selector unit; a fourth resequence unit for resequencing the order of an output of said third butterfly operation unit into a predetermined order to output an orthogonal transformed signal; a fourth selector unit for selecting one of three outputs from said first, second and third resequence units; said multiplication unit being adapted to multiply an output of said forth selector unit by a multiplier selected in a predetermined order; a fifth selector unit for selecting one of two outputs from said second and third resequence units; and said subtraction unit being adapted to subtract an output of said multiplication unit from said fifth selector unit, an orthogonal transformation apparatus for orthogonally transforming an input signal comprising a set of digitalized 8 data into an output signal comprising data, each having as a base each component of eight point inverse cosine transformation; comprising: a first resequence unit for resequencing the order of the set of input signals into a predetermined order; a first butterfly operation unit for performing a butterfly operation which is an addition and subtraction between data separated by a predetermined simple of an output of said first resequence unit; a second resequence unit for resequencing the order of the output of said first butterfly operation unit; a first delay unit for delaying an output of said second resequence unit by a predetermined period of time; a first selector unit for selecting one of three outputs from said first delay unit, a multiplication unit and an addition unit in a predetermined order; a second butterfly operation unit for performing a butterfly operation for the output of said first selector; a third resequence unit for resequencing the order of the output of said second butterfly operation unit; a second delay unit for delaying an output of said third resequence unit by a predetermined period of time; a second selector unit for selection one of three outputs from said second delay unit, said multiplication unit and said addition unit; a third butterfly operation unit for performing a butterfly operation for an output of said second selector; a fourth resequence unit for resequencing the order of an output of said third butterfly operation unit into a predetermined order to output an orthogonal transformed signal; a third selector unit for selecting one of two outputs from said third delay unit and said multiplication unit in a predetermined order; said addition unit being adapted to perform an addition between data selected by the output of said third selector unit; said multiplication unit being adapted to multiply an output of said addition unit by a multiplier selected in a predetermined order, and an orthogonal transformation apparatus for orthogonally transforming an input signal comprising a set of digitalized 8 data into an output signal comprising data, each having as a base each component of eight point inverse cosine transformation; comprising: a first resequence unit for resequencing the order of the set of input signals into a predetermined order; a first butterfly operation unit for performing a butterfly operation which is an addition and subtraction between data separated by a predetermined sample of an output of said first resequence unit; a second resequence unit for resequencing the order of the output of said first butterfly operation unit; a first delay unit for delaying an output of said second resequence unit by a predetermined period of time; a first selector unit for selecting one of two outputs from said first delay unit and a subtraction unit in a predetermined order; a second butterfly operation unit for performing a butterfly operation for the output of said first selector; a third resequence unit for resequencing the order of the output of said second butterfly operation unit; a second delay unit for delaying an output of said third resequencing unit by a predetermined period of time; a second selector unit for selecting one of two outputs from said second delay unit and said subtraction unit; a third butterfly operation unit for performing a butterfly operation for an output of said second selector; a fourth resequence unit for resequencing the order of output of said third butterfly operation unit into a predetermined order to output an orthogonal transformed signal; a third selector unit for selecting one of two outputs from said second and third resequence units in a predetermined order; a multiplication unit for multiplying an output of said third selector by a multiplier selected in a predetermined order; and a fourth selector unit for selecting one of two outputs from said second and third resequence units in a predetermined order; said subtraction unit being adapted to subtract the output of said fourth selector from the output of said multiplication unit.

In accordance with the foregoing structure, the number of multiplications necessary for calculation of an orthogonal transformation of eight point cosine transformation or eight point inverse cosine transformation is not more than eight if a special weighting and a special fast operation algorithm are used. Therefore, the orthogonal transformation apparatus can be implemented with one multiplication unit by using the multiplication unit which is capable of performing one multiplication for an operation period of time of one sample in a time-sharing basis.

DESCRIPTION OF THE PREFERRED EMBODIMENTS

Figure 1:
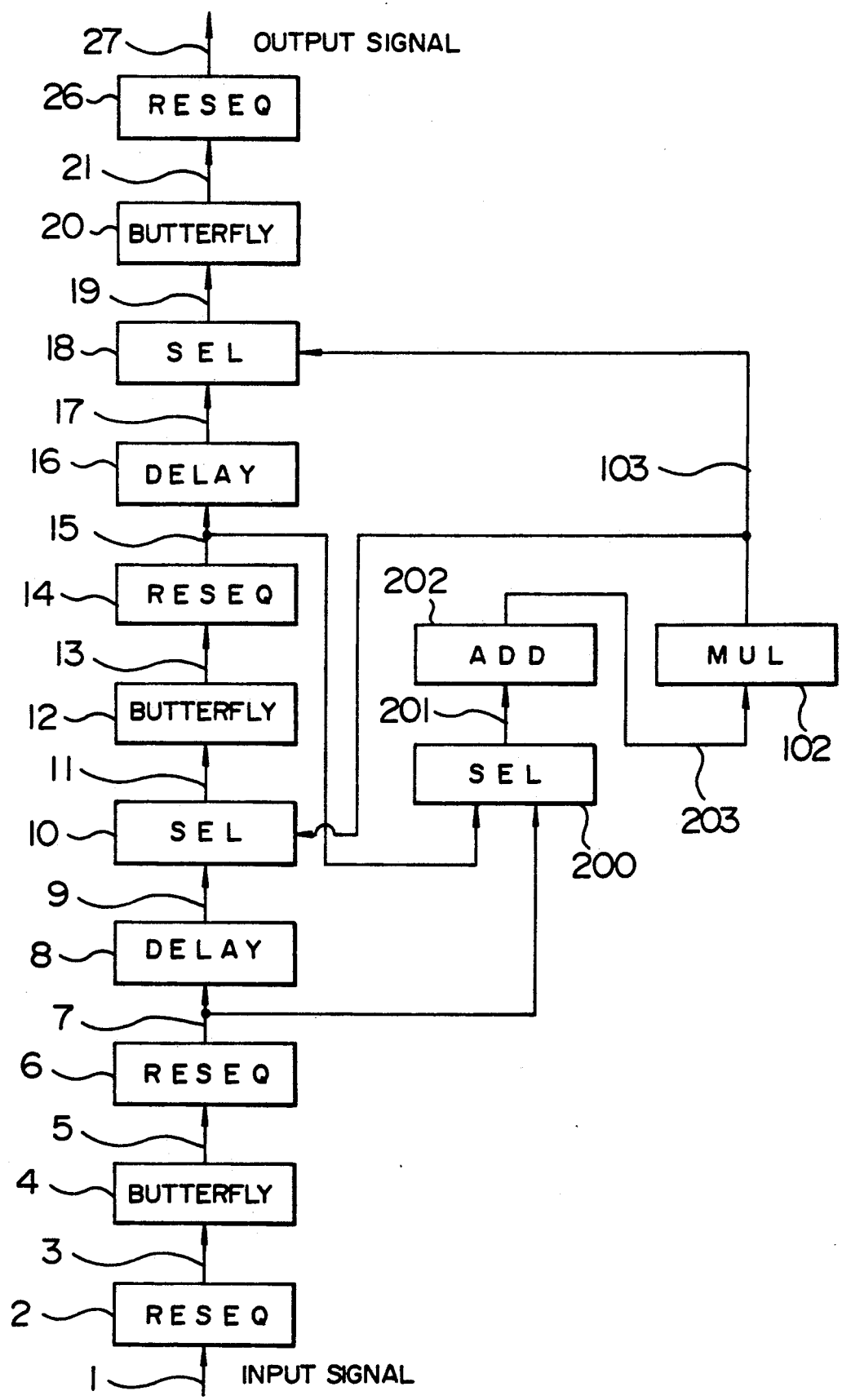
FIG. 1 a block diagram showing a first embodiment of an orthogonal transformation apparatus of the present invention.

A block diagram of a first embodiment of an orthogonal transformation apparatus is shown in FIG. 1.

FIG. 1 shows the orthogonal transformation apparatus for obtaining Z0, ... Z7 which are DCT results of performing weighting $$Z_0 = 2Y_0 \cdot \cos(\pi/4)$$

$$Z_i = 2Y_i \cdot \cos(i \cdot /16), \text{ for } 1 \leq i < 8 \quad (9)$$

for Y0, ..., Y7 which are obtained by performing 8 point DCT for input signals X0, ..., X7.

That calculation may be made by five multiplications in DCT if weighting is used will be shown.

If representing as follows:

$$A_i = X_i + X_{7-i},\ A_{i+4} = X_i - X_{7-i}$$

$$\text{for } 0 \leq i < 4 \quad (10)$$

,the formulae (1) to (8) are modified as follows:

$$Y_0 = C_4(A_0 + A_1 + A_2 + A_3) \quad (11)$$

$$Y_1 = C_1 A_4 + C_3 A_5 + C_5 A_6 + C_7 A_7 \quad (12)$$

$$Y_2 = C_2 A_2 + C_6 A_1 - C_6 A_2 - C_2 A_3 \quad (13)$$

$$Y_3 = C_3 A_4 - C_7 A_5 - C_1 A_6 - C_5 A_7 \quad (14)$$

$$Y_4 = C_4(A_0 - A_1 - A_2 + A_3) \quad (15)$$

$$Y_5 = C_5 A_4 - C_1 A_5 + C_7 A_6 + C_3 A_7 \quad (16)$$

$$Y_6 = C_6 A_0 - C_2 A_1 + C_2 A_2 - C_6 A_3 \quad (17)$$

$$Y_7 = C_7 A_4 - C_5 A_5 + C_3 A_6 - C_1 A_7 \quad (18)$$

If the formulae (11) to (18) is substituted with the formula (9), the following formulae are established.

$$Z_0 = 2C_4 C_4 (A_0 + A_1 + A_2 + A_3) \quad (19)$$

$$Z_1 = 2C_1(C_1 A_4 + C_3 A_5 + C_5 A_6 + C_7 A_7) \quad (20)$$

$$Z_2 = 2C_2(C_2 A_0 + C_6 A_1 - C_6 A_2 - C_2 A_3) \quad (21)$$

$$Z_3 = 2C_3(C_3 A_4 - C_7 A_5 - C_1 A_6 - C_5 A_7) \quad (22)$$

$$Z_4 = 2C_4(A_0 - A_1 - A_2 + A_3) \quad (23)$$

$$Z_5 = 2C_5(C_5 A_4 - C_1 A_5 + C_7 A_6 + C_3 A_7) \quad (24)$$

$$Z_6 = 2C_6(C_6 A_0 - C_2 A_1 + C_2 A_2 - C_6 A_3) \quad (25)$$

$$Z_7 = 2C_7(C_7 A_4 - C_5 A_5 + C_3 A_6 - C_1 A_7) \quad (26)$$

From an addition theorem, the following formula is established. Accordingly, substitution of the formulae (19) to (26) with the formula (27) establishes the formulae as follows:

$$C_i C_j = (C_{i+j} + C_{i-j})/2 \quad (27)$$

$$Z_0 = A_0 + A_1 + A_2 + A_3 \quad (28)$$

$$Z_1 = (C_2 + 1)A_4 + (C_4 + C_2)A_5 + (C_4 + C_6)A_6 + C_6 A_7 \quad (29)$$
$$= C_2(A_4 + A_5) + C_6(A_6 + A_7) + A_4 + C_4(A_5 + A_6)$$

$$Z_2 = (C_4 + 1)A_0 + C_4 A_1 - C_4 A_2 + (-C_4 + 1)A_3 \quad (30)$$
$$= C_4(A_0 + A_1 - A_2 - A_3) + A_0 + A_3$$

$$Z_3 = (C_6 + 1)A_4 - (C_4 - C_6)A_5 - (C_4 + C_2)A_6 - C_2 A_7 \quad (31)$$
$$= C_6(A_4 + A_5) - C_2(A_6 + A_7) + A_4 - C_4(A_5 + A_6)$$

$$Z_4 = A_0 - A_1 - A_2 + A_3 \quad (32)$$

$$Z_5 = (-C_6 + 1)A_4 - (C_8 + C_4)A_5 + (C_2 - C_4)A_6 + C_2 A_7 \quad (33)$$
$$= -C_6(A_4 + A_5) + C_2(A_6 + A_7) + A_4 - C_4(A_5 + A_6)$$

$$Z_6 = (-C_4 + 1)A_0 - C_4 A_1 + C_4 A_2 + (C_4 + 1)A_3 \quad (34)$$
$$= -C_4(A_0 + A_1 - A_2 - A_3) + A_0 + A_3$$

$$Z_7 = (-C_2 + 1)A_4 - (C_2 - C_4)A_5 + (C_4 - C_6)A_6 - C_6 A_7 \quad (35)$$
$$= -C_2(A_4 + A_5) - C_6(A_6 + A_7) + A_4 + C_4(A_5 + A_6)$$

If representing $$M_0 = C_4(A_0 + A_1 - A_2 - A_3) \quad (36)$$

the formulae (30) and (34) are expressed as follows:

$$Z_2 = M_0 + A_0 + A_3 \quad (37)$$

$$Z_6 = -M_0 + A_0 + A_3 \quad (38)$$

If representing $$M_1 = C_4(A_5 + A_6) \quad (39)$$

$$M_2 = C_4(A_4 + A_7) \quad (40)$$

the formulae (29), (31), (35) are expressed as follows:

$$Z_1 = (C_2 - C_6)(A_4 + A_5) + 2C_4 C_6(M_1 + M_2) + A_4 + M_1 \quad (41)$$
$$= 2C_6 C_4(A_4 + A_5) + 2C_4 C_6(M_1 + M_2) + A_4 + M_1$$
$$= 2C_6 C_4(A_4 + A_5 + M_1 + M_2) + A_4 + M_1$$
$$= M_3 + A_4 + M_1$$

$$Z_3 = (C_6 + C_2)(A_4 + A_5) - 2C_4 C_2(B_6 + B_7) + A_4 - M_1 \quad (42)$$
$$= 2C_2 C_4(A_4 + A_5) - 2C_4 C_{23}(B_6 + B_7) + A_4 - M_1$$
$$= 2C_2 C_4(A_4 + A_5 - M_1 - M_2) + A_4 - M_1$$
$$= M_4 + A_4 - M_1$$

$$Z_5 = -(C_2 + C_6)(A_4 + A_5) + 2C_4 C_2(M_1 + M_2) + A_4 - M_1 \quad (43)$$
$$= -2C_2 C_4(A_4 + A_5) + 2C_4 C_2(M_1 + M_2) + A_4 - M_1$$
$$= -2C_2 C_4(A_4 + A_5 - M_1 - M_2) + A_4 - M_1$$
$$= -M_4 + A_4 - M_1$$

$$Z_7 = -(C_2 - C_6)(A_4 + A_5) - 2C_4 C_6(M_1 + M_2) + A_4 + M_1 \quad (44)$$
$$= -2C_6 C_4(A_4 + A_5) - 2C_4 C_6(M_1 + M_2) + A_4 + M_1$$
$$= -2C_6 C_4(A_4 + A_5 + M_1 + M_2) + A_4 + M_1$$
$$= -M_3 + A_4 + M_1$$

$$= -2C_6 C_4(A_4 + A_5 + M_1 + M_2) + A_4 + M_1$$

$$= -M_3 + A_4 + M_1 \quad (44)$$

if representing $$M_3 = 2C_6 C_4(A_4 + A_5 + M_1 + M_2) \quad (45)$$

$$M_4 = 2C_2 C_4(A_4 + A_5 - M_1 - M_2) \quad (46)$$

Figure 2:
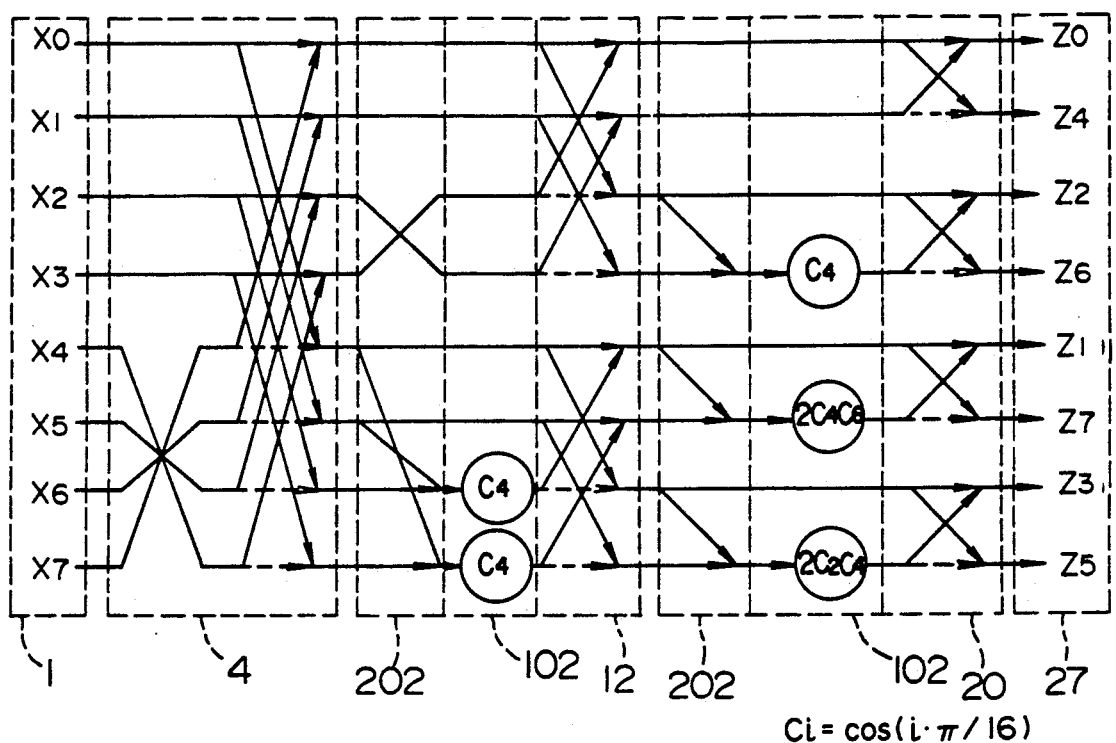
FIG. 2 is a signal flow chart of the first embodiment.

It is found from the foregoing result that the formulae 28, 32, 37, 38, 41, 42, 43 and 44 require only multiplications in five times necessary for the calculation of M0, M1, M2, M3 and M4. FIG. 2 is a signal flow chart showing the foregoing calculation process. In this drawing, an intersection between solid line arrows represents an addition operation, an intersection between a solid line arrow and a dotted line arrow represents a subtraction of a value of the dotted line from a value of the solid line and a reference in a circle represents a multiplier by which the value is multiplied.

Now, operation in the block diagram of FIG. 1 will be explained. An input signal 1 is converted into a signal 3 so that the order of input data {X0 .... X7} is resequenced to the order {X0, X1, X2, X3, X7, X6, X5, X4} by a resequence unit 2. Butterfly operation of the data of the signal 3 which are separated by four samples is performed to output a signal 5. The butterfly operation of the data which are separated by m samples can be implemented by a structure shown in FIG. 3. A butterfly input signal 600 is delayed by m samples by a delay unit 601 to provide a signal 602. A signal 602 is further delayed by a delay unit 603 to provide a signal 604. The signal 600 is thus m samples subsequent relative to the signal 602 and the signal 604 is m samples previous to the signal 602. A selector unit 605 selects either one of the signals 600 and 604 depending with which data, m sample subsequent data or m sample previous data operation for the signal 602 is performed to provide a signal 606. Addition or subtraction operation between the signals 602 and 606 is performed in an addition or subtraction unit 607 to provide a butterfly output signal 608. The output signal 5 of the thus formed butterfly operation unit is inputted to the resequence unit 6 at which third data comprising a set of 8 data is replaced with the fourth data and the order of the data is resequenced so that addition between the fifth and eighth data, the sixth and seventh data is easily performed for outputting a signal 7. The signal 7 is delayed by a delay unit 8 by a period of time for which addition and multiplication by C4 is performed to provide a signal 9. A selector unit 10 selects either one of the multiplied data 103 or the unmultiplied signal 9 to perform the operation shown in FIG. 2 for it to provide a signal 11. The signal 11 is subjected to a butterfly operation of 2 sample separated data by a butterfly operation unit 12 to provide a signal 13. The signal 13 is subjected to resequence of the order of data by a resequence unit 14 so that operation of addition of the third data to the fourth data and multiplication of the sum by C4, addition of the fifth data to the sixth data and multiplication of the sum by 2C6C4 and addition of the seventh data to eighth data and multiplication of the sum by 2C2C4 is readily performed to provide a signal 15. The signal 15 is delayed by a delay unit 16 by a period of time for which addition o multiplication is performed to provide a signal 17. A selector 18 selects one of multiplied data 103 or unmultiplied signal 17 to perform the operation shown in FIG. 2 of the selected data to provide a signal 19. The signal 19 is subjected to an butterfly operation of the one sample separated data by a butterfly operation unit 20 to provide a signal 20. The signal 20 is inputted to a resequence unit 26 in which orthogonally transformed signals are resequenced so that a signal 27 is outputted in order of Z0, ...., Z7. On the other hand, a set of either data of the signal 7 or the signal 15 is selected by a selector unit 200 to provide a signal 201. The signal 201 is inputted to an addition unit 202 to provide a signal 203. The signal 203 is multiplied by either one of C4, 2C6C4 or 2C2C4 by a multiplication unit 102 to provide a signal 103.

For reference, operation corresponding to each block in FIG. 1 is represented by like reference numeral in the signal flow chart of FIG. 2.

As mentioned above, in the present embodiment, DCT a form of the orthogonal transformation and weighting can be implemented by a total sum of 5 multiplications and 5 additions in addition to the butterfly operations. Since multiplications and additions can be achieved by using on a time sharing basis one multiplication unit which is capable of performing one multiplication for an interval of one sample and one addition unit which is capable of performing one addition operation for an interval of one sample, implementation of the orthogonal transformation apparatus by a hardware becomes easier. The implementation by prior art orthogonal transformation requiring 12 multiplications for only DCT is impossible.

Figure 4:
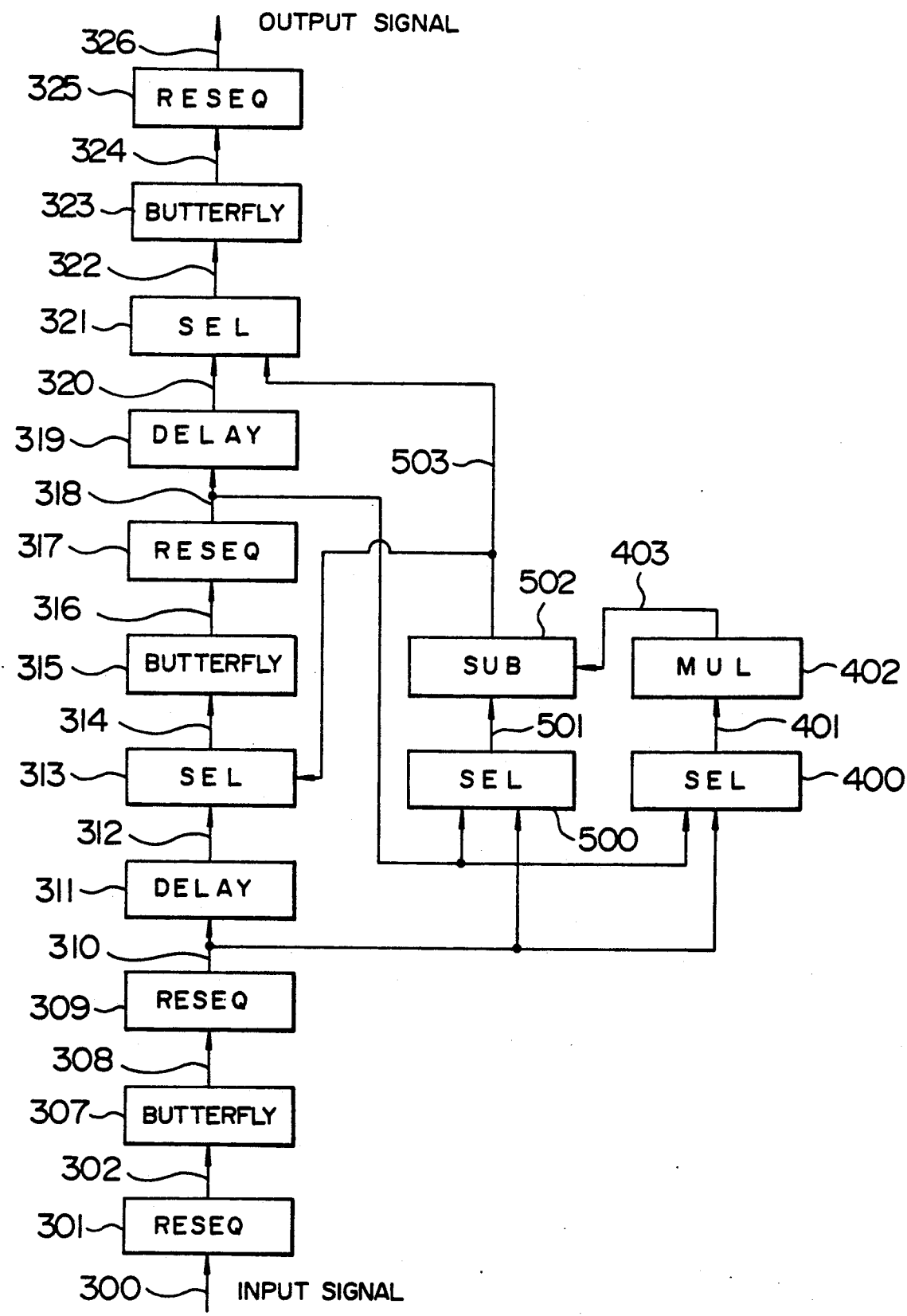
FIG. 4 is a block diagram showing a second embodiment of an orthogonal transformation apparatus of the present invention.

FIG. 4 is a block diagram showing an orthogonal transformation apparatus for performing an inverse transformation of the orthogonal transformation apparatus shown in FIGS. 1 and 2. Accordingly weighting of inverse values of the first embodiment is performed. If the signals which have been processed by the orthogonal transformation apparatus of FIG. 1 are processed by the orthogonal transformation apparatus, they can be decoded into the original inputted signals within the range of a calculation error. The processing process of the block diagram of FIG. 4 is shown in the signal flow chart of FIG. 5. Since operation of each block of FIG. 4 like to operation of FIG. 5 is represented by like reference numeral, detailed operation is omitted.

Figure 5:
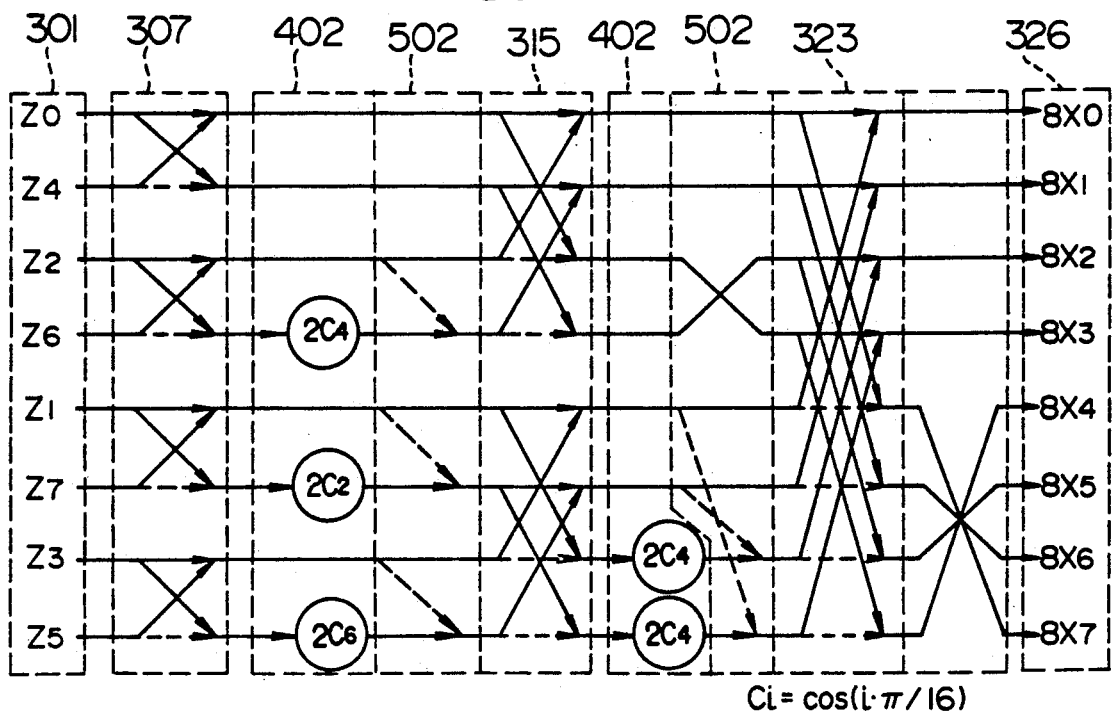
FIG. 5 is a signal flow chart of the second embodiment of the orthogonal transformation apparatus of the present invention.

It is found from FIG. 5 that an inverse DCT a form of orthogonal transformation and weighting can be implemented by a total sum of 5 multiplications in the present embodiment, so that implementation by a hardware becomes easier.

Now, consideration will be made for a case of weighting as follows:

$$Z_0 = 2Y_0$$

$$Z_i = 2W_i Y_i / \sin(i \cdot \pi/16), \text{ for } 1 \leq i < 8 \tag{47}$$

wherein
$$W_1 = \tfrac{1}{2}, W_2 = \tfrac{1}{2}, W_3 = 7/16,$$

$$W_4 = W_5 = W_6 = W_7 = \tfrac{1}{2}, \tag{48}$$

Figure 6:
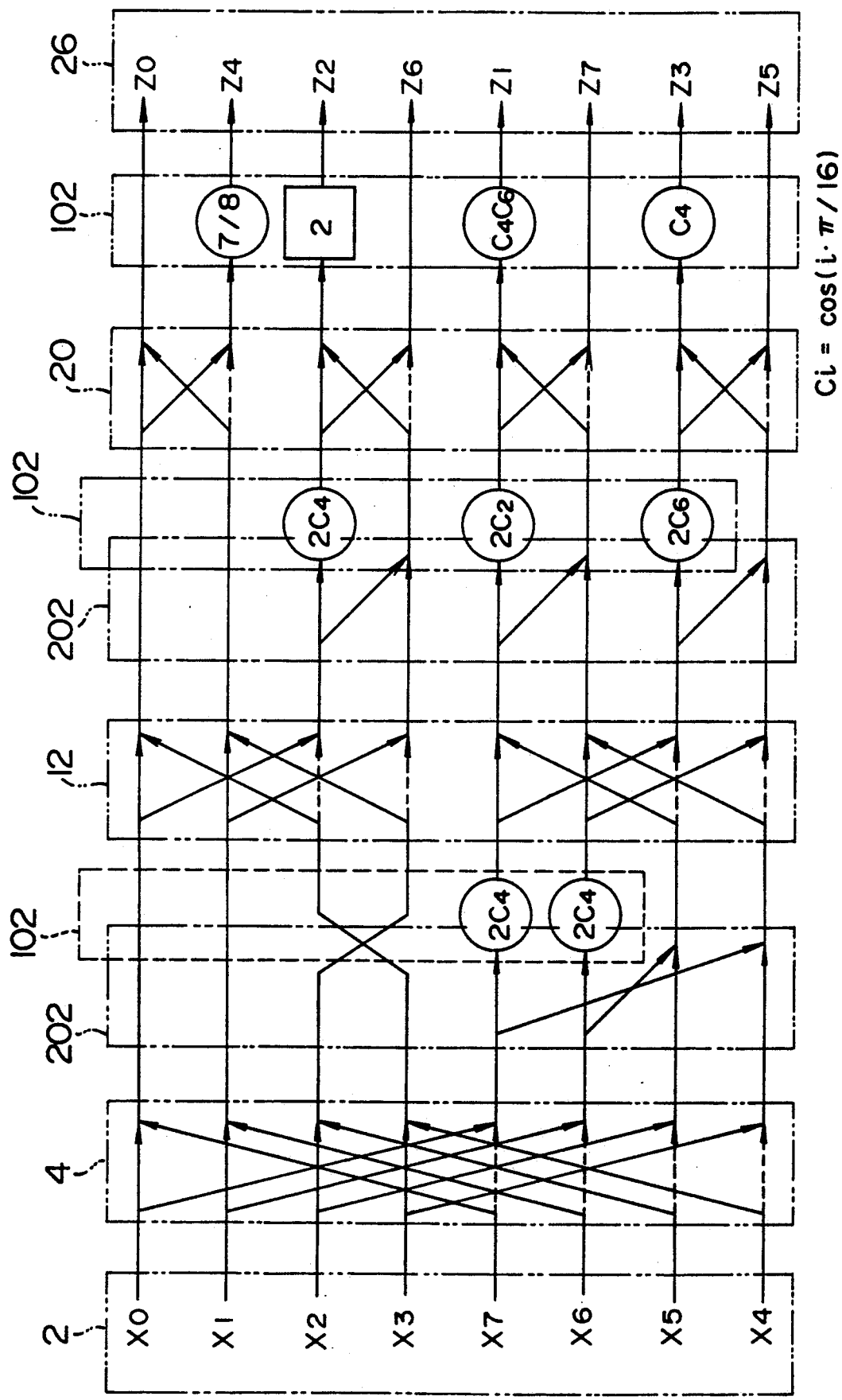
FIG. 6 is a signal flow chart showing a third embodiment of an orthogonal transformation apparatus of the present invention.
Figure 7:
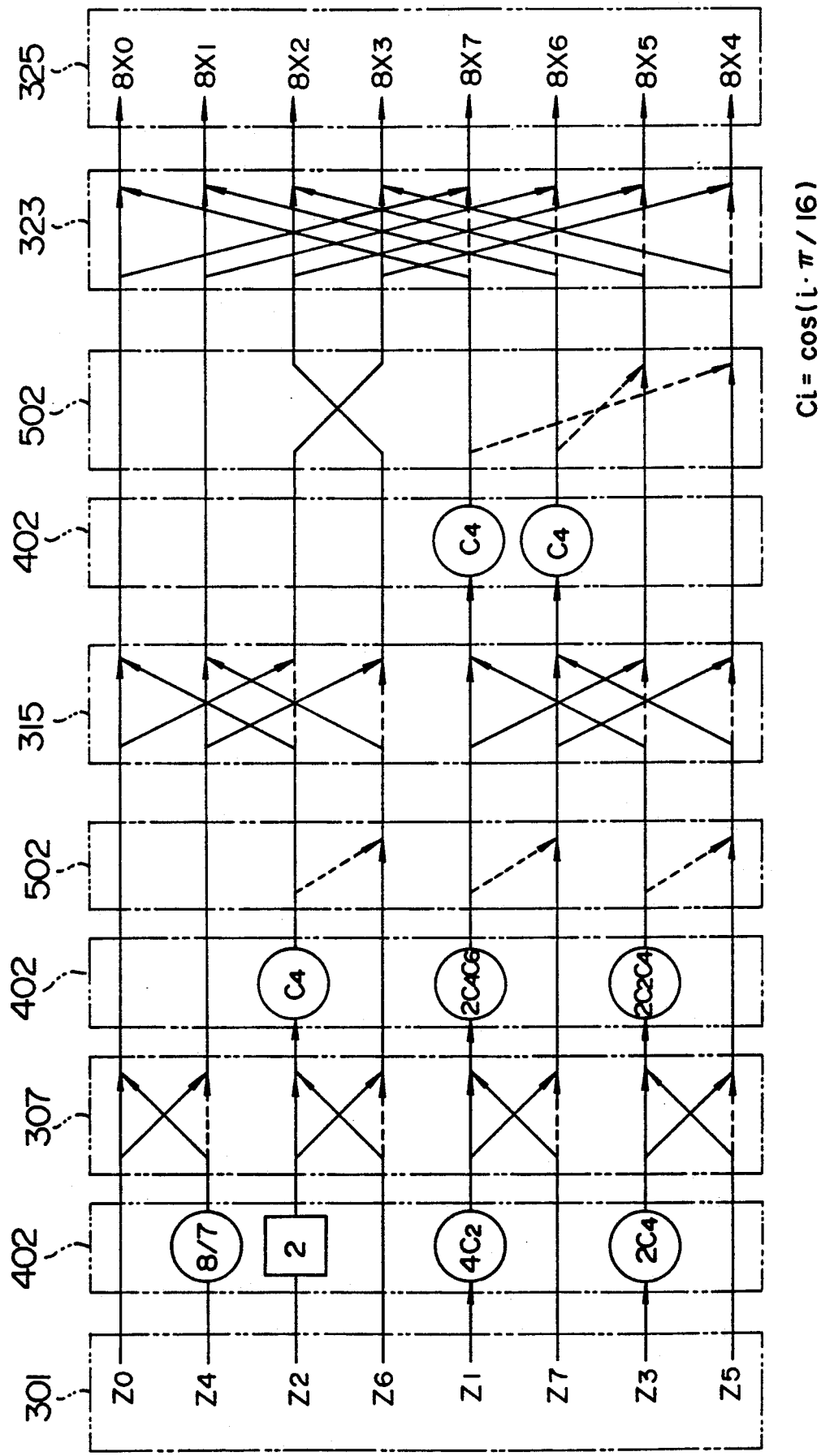
FIG. 7 is a signal flow chart of a fourth embodiment of an orthogonal transformation apparatus of the present invention.

A signal flow chart of an orthogonal transformation which is a DCT in which this weighting is made is shown in FIG. 6. A signal flow chart of an orthogonal transformation which is an inverse transformation of the orthogonal transformation shown in FIG. 6 is shown in FIG. 7. Operation encircled by a square in FIGS. 6 and 7 represent multiplication implemented by only bit shifting. The number of multiplications which can not be performed by bit shifting in both FIGS. 6 and 7 is five. Accordingly, remarkable reduction in size of the hardware can be achieved if one multiplication unit which is capable of performing one multiplication per one sample and one addition or subtraction unit which is capable of performing one addition or subtraction are used on a time-sharing basis.

Figure 8:
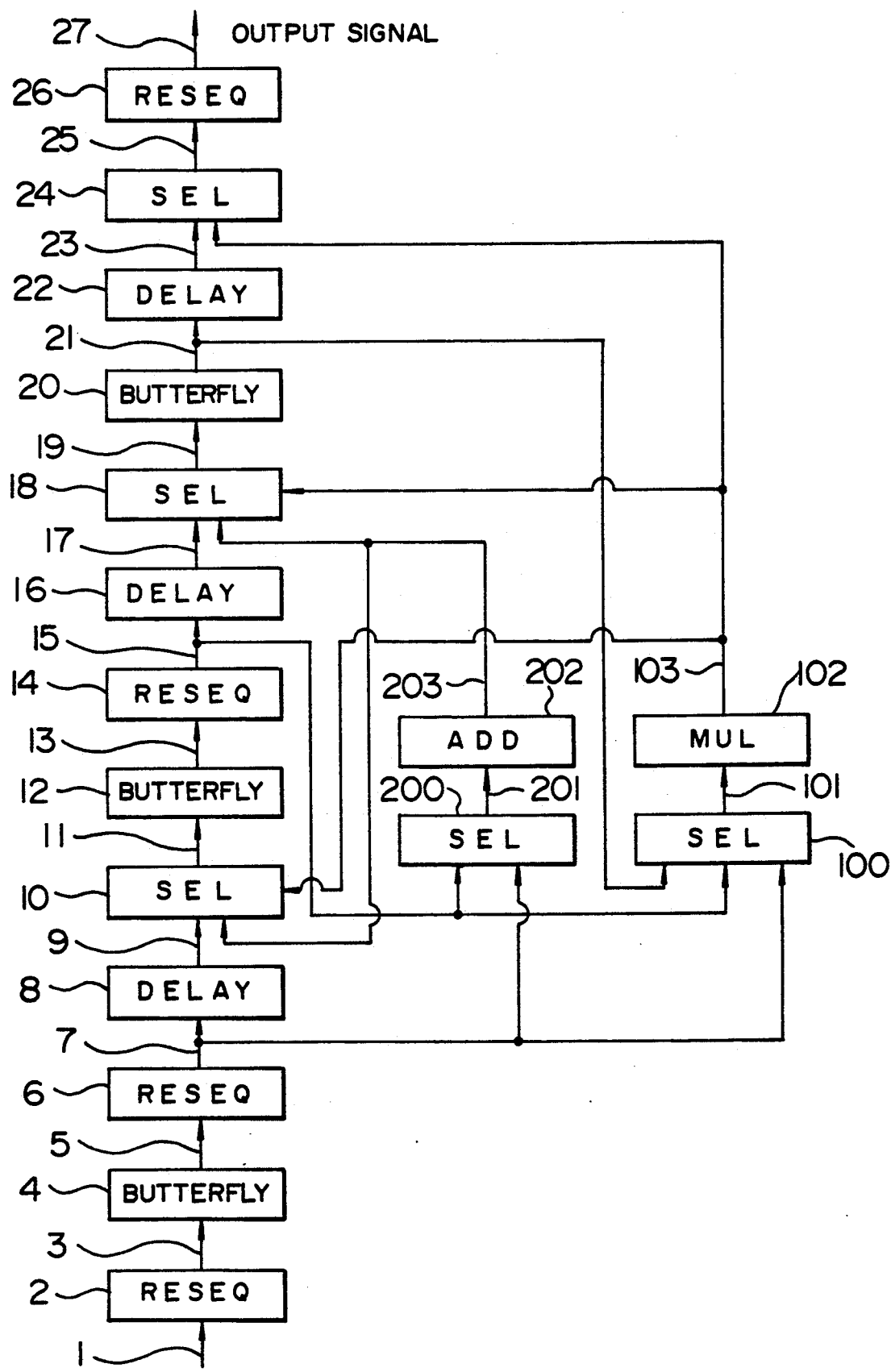
FIG. 8 is a block diagram of the third embodiment of the orthogonal transformation apparatus of the present invention.
Figure 9:
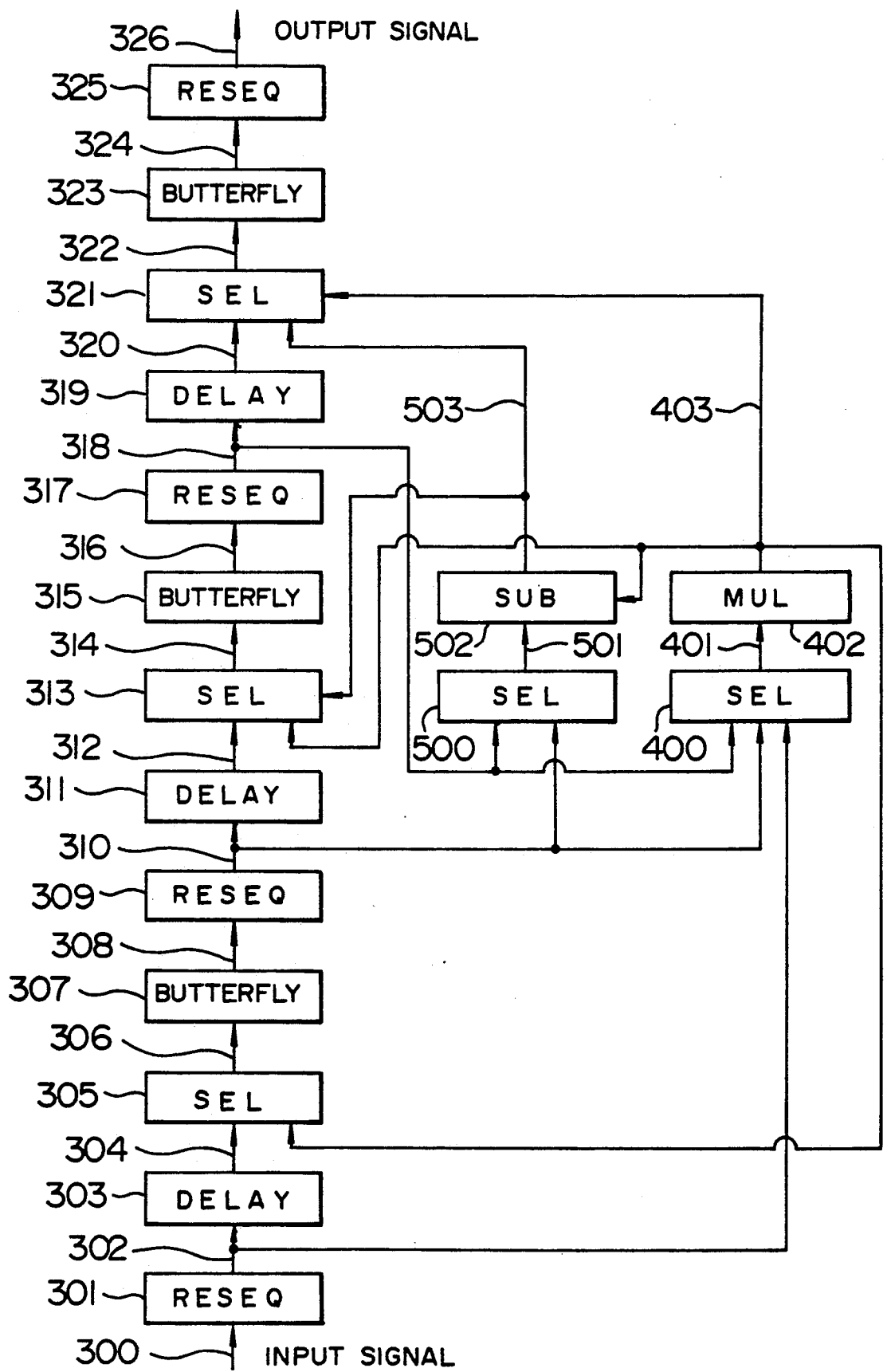
FIG. 9 is a block diagram showing the fourth embodiment of the orthogonal transformation apparatus of the present invention.
Figure 10:
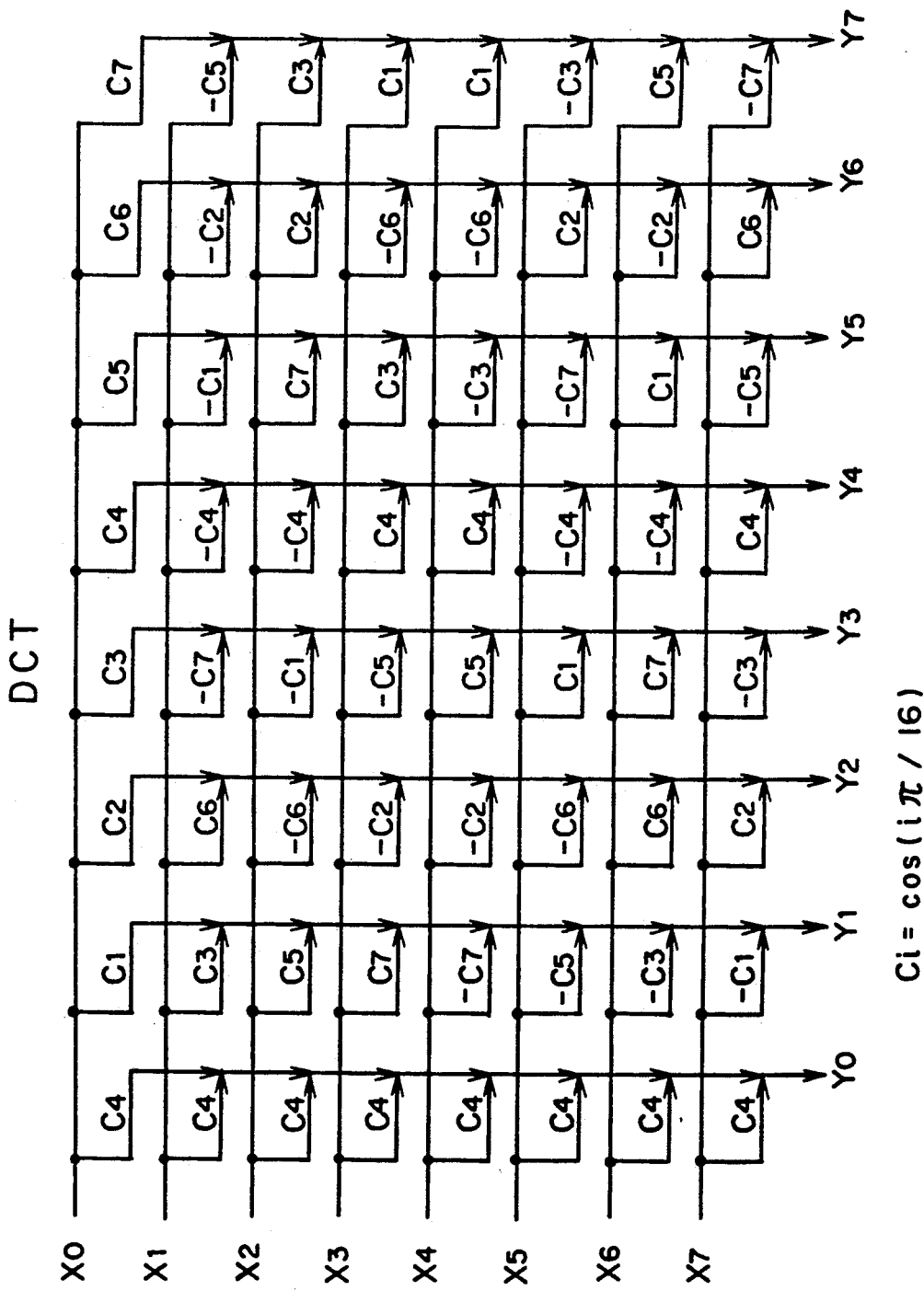
FIG. 10 is a diagram illustrating eighth order DCT.
Figure 11:
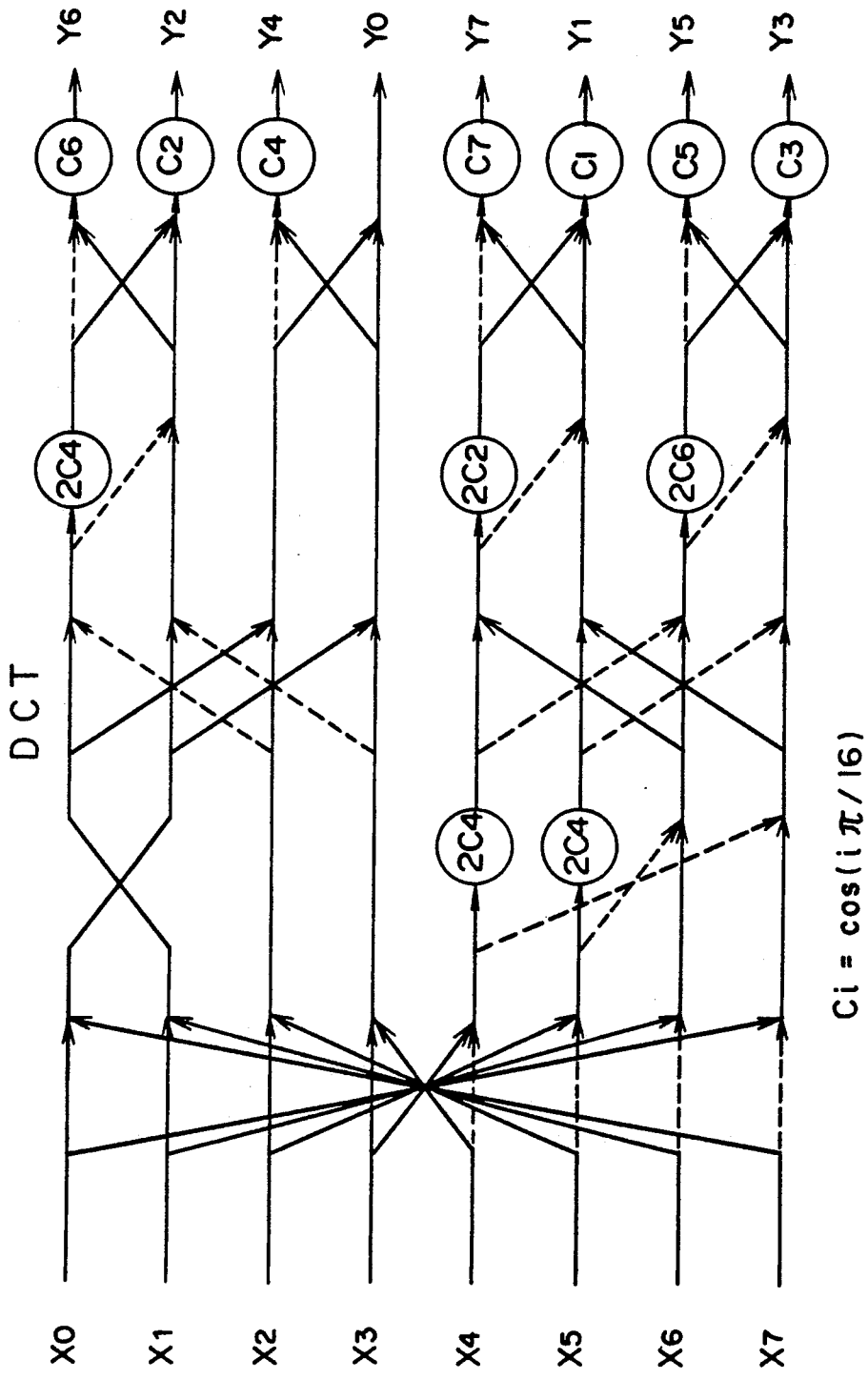
FIG. 11 is a diagram illustrating eighth order FDCT.
Figure 12:
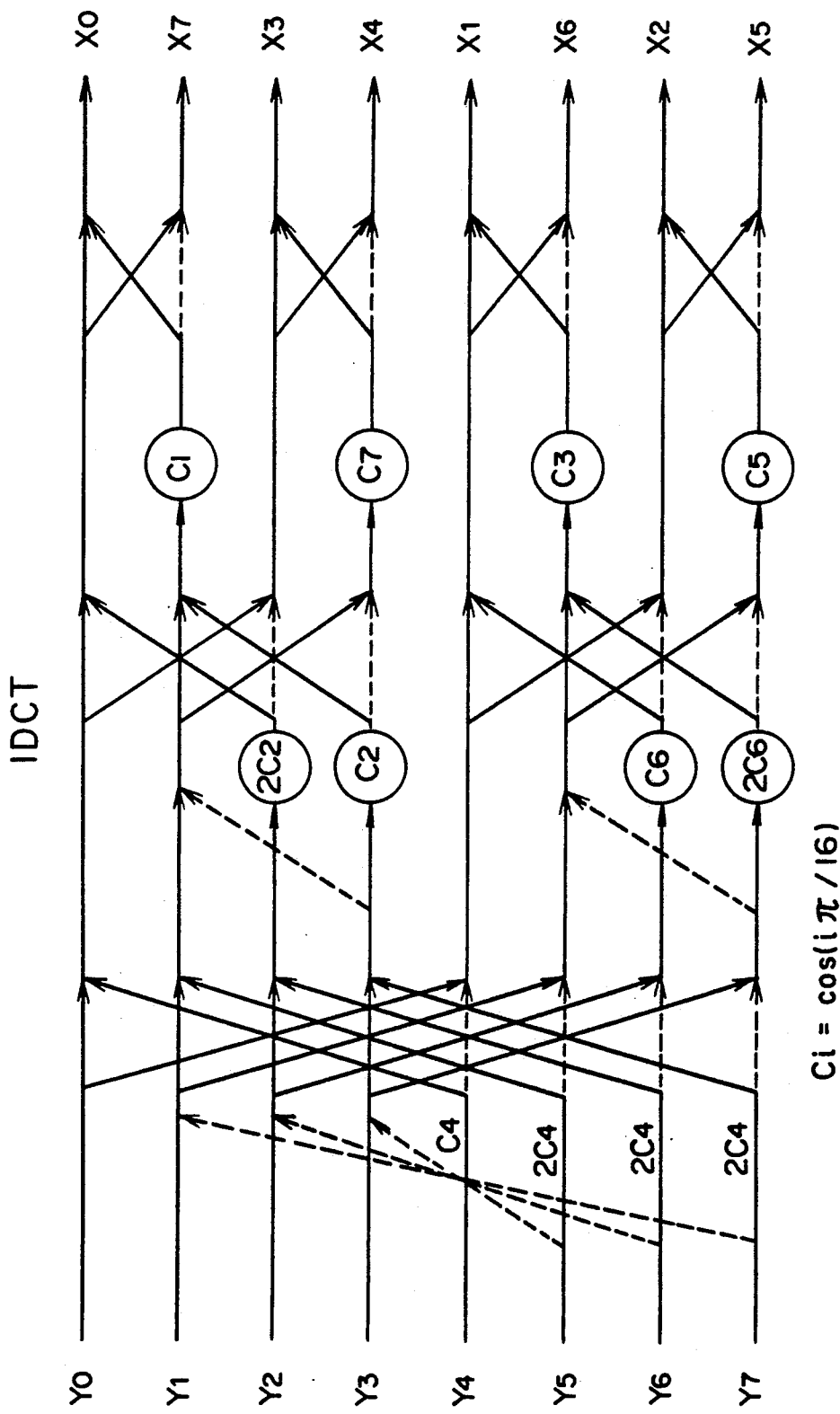
FIG. 12 is a diagram illustrating eighth order FIDCT.
Figure 13:
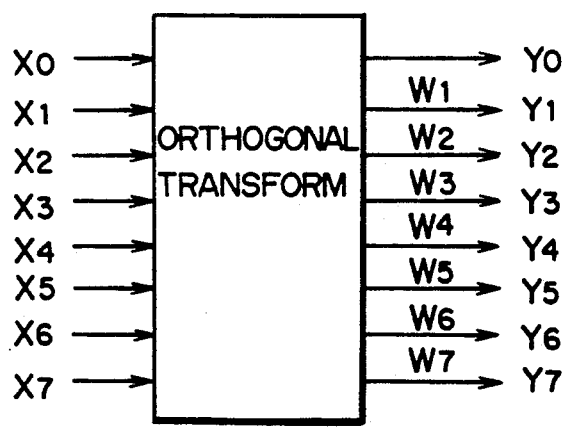
FIG. 13 is a diagram illustrating FDCT with weighting.

Block diagrams for implementing the signal flow charts in FIGS. 6 and 7 are shown in FIGS. 8 and 9, respectively. Since the operation in FIGS. 8 and 9 is substantially identical with that in FIG. 1. Operation of each block in FIGS. 8 and 9 corresponding to that in FIG. 1 is represented by like reference numeral, description of them will be omitted.

Figure 3:
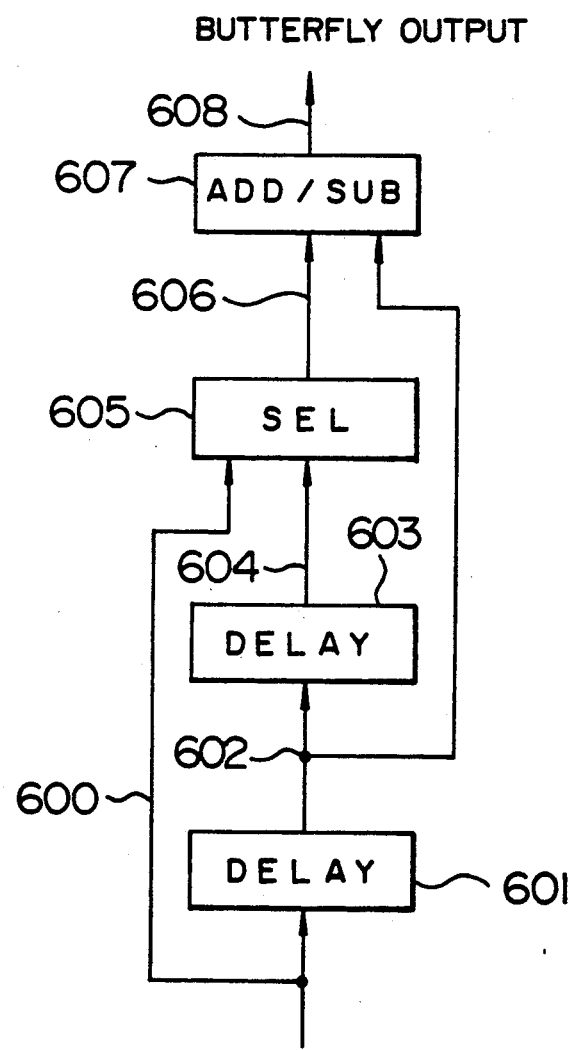
FIG. 3 is a block diagram showing the structure of a butterfly operation unit.

Only five multiplications are necessary in the embodiments shown in FIGS. 1 and 4, 3 excess multiplications can be performed if a multiplication unit which is capable of performing one multiplication per one sample is used. Therefore, the three multiplications may be used for other calculation.

We claim:

1. An orthogonal transformation apparatus for orthogonally transforming an input signal comprising a set of digitalized 8 data into an output signal comprising data, each having as a base each component of eight point cosine transformation; comprising;

a first resequence unit for resequencing the order of the set of input signals into a predetermined order;

a first butterfly operation unit for performing a butterfly operation which is an addition and subtraction between data separated by a predetermined sample of an output of said first resequence unit;

a second resequence unit for resequencing the order of the output of said first butterfly operation unit;

a first delay unit for delaying an output of said second resequence unit by a predetermined period of time;

a first selector unit for selecting one of three outputs from said first delay unit, a multiplication unit and an addition unit in a predetermined order;

a second butterfly operation unit for performing a butterfly operation for the output of said first selector;

a third resequence unit for resequencing the order of the output of said second butterfly operation unit;

a second delay unit for delaying an output of said third resequence unit by a predetermined period of time;

a second selector unit for selecting one of three outputs from said second delay unit, said multiplication unit and said addition unit;

a third butterfly operation unit for performing a butterfly operation for an output of said second selector;

a third delay unit for delaying an output of said third butterfly operation unit by a predetermined period of time;

a third selector unit for selecting one of two outputs from said third delay unit and said multiplication unit in a predetermined order;

a fourth resequence unit for resequencing the order of output of said third selector into a predetermined order to output an orthogonal transformed signal;

a fourth selector unit for selecting one of three outputs from said second and third resequence units, and said third butterfly operation unit in a predetermined order;

said multiplication unit being adapted to multiply an output of said fourth selector by a multiplier selected in a predetermined order;

a fifth selector unit for selecting a set of data from two outputs from said second and third resequence units in a predetermined order; and said addition unit being adapted to perform addition for an output of said fifth selector.

2. An orthogonal transformation apparatus as defined in claim 1 in which said delay units and selector units comprise memories and control means for said memories.

3. An orthogonal transformation apparatus for orthogonally transforming an input signal comprising a set of 8 digitalized data into an output signal comprising data each having as a base each component of 8 point inverse cosine transformation comprising;

a first resequence unit for resequencing the order of the input signal of said one set of data into a predetermined order;

a first delay unit for delaying an output of said first resequence unit by a predetermined period of time;

a first selector unit for selecting one of two outputs of said first delay unit and a multiplication unit in a predetermined order;

a first butterfly operation unit for performing a butterfly operation which is an addition and subtraction operation between data separated by a predetermined sample of an output of said first selector unit;

a second resequence unit for resequencing the order of an output of said first butterfly operation unit into a predetermined order;

a second delay unit for delaying an output of said second resequence unit by a predetermined period of time;

a second selector unit for selecting one of three outputs from said second delay unit, said multiplication unit and a subtraction unit in a predetermined order;

a second butterfly unit for performing a butterfly operation for an output of said selector unit;

a third resequence unit for resequencing the order of said second butterfly operation unit into a predetermined order;

a third delay unit for delaying an output of said third resequence unit by a predetermined period of time;

a third selector unit for selecting one of three outputs from said third delay unit, said multiplication unit and said subtraction unit in a predetermined order;

a third butterfly operation unit for performing a butterfly operation for an output of said third selector unit;

a fourth resequence unit for resequencing the order of an output of said third butterfly operation unit into a predetermined order to output an orthogonal transformed signal;

a fourth selector unit for selecting one of three outputs from said first, second and third resequence units;

said multiplication unit being adapted to multiply an output of said fourth selector unit by a multiplier selected in a predetermined order;

a fifth selector unit for selecting one of two outputs from said second and third resequence units; and said subtraction unit being adapted to subtract an output of said multiplication unit from said fifth selector unit.

4. An orthogonal transformation apparatus as defined in claim 3 in which said delay units and selector units comprise memories and control means for said memories.

5. An orthogonal transformation apparatus for orthogonally transforming an input signal comprising a set of digitalized 8 data into an output signal comprising data, each having as a base each component of eight point inverse cosine transformation; comprising:

a first resequence unit for resequencing the order of the set of input signals into a predetermined order;

a first butterfly operation unit for performing a butterfly operation which is an addition and subtraction between data separated by a predetermined sample of an output of said first resequence unit;

a second resequence unit for resequencing the order of the output of said first butterfly operation unit;

a first delay unit for delaying an output of said second resequence unit by a predetermined period of time;

a first selector unit for selecting one of three outputs from said first delay unit, a multiplication unit and an addition unit in a predetermined order;

a second butterfly operation unit for performing a butterfly operation for the output of said first selector;

a third resequence unit for resequencing the order of the output of said second butterfly operation unit;

a second delay unit for delaying an output of said third resequence unit by a predetermined period of time;

a second selector unit for selecting one of three outputs from said second delay unit, said multiplication unit and said addition unit;

a third butterfly operation unit for performing a butterfly operation for an output of said second selector;

a fourth resequence unit for resequencing the order of an output of said third butterfly operation unit into a predetermined order to output an orthogonal transformed signal;

a third selector unit for selecting one of two outputs from said third delay unit and said multiplication unit in a predetermined order;

said addition unit being adapted to perform an addition between data selected by the output of said third selector unit;, said multiplication unit being adapted to multiply an output of said addition unit by a multiplier selected in a predetermined order.

6. An orthogonal transformation apparatus as defined in claim 5 in which said delay units and selector units comprise memories and control means for said memories.

7. An orthogonal transformation apparatus for orthogonally transforming an input signal comprising a set of digitalized 8 data into an output signal comprising data, each having as a base each component of eight point inverse cosine transformation; comprising;

- a first resequence unit for resequencing the order of the set of input signals into a predetermined order;
- a first butterfly operation unit for performing a butterfly operation which is an addition and subtraction between data separated by a predetermined sample of an output of said first resequence unit;
- a second resequence unit for resequencing the order of the output of said first butterfly operation unit;
- a first delay unit for delaying an output of said second resequence unit by a predetermined period of time;
- a first selector unit for selecting one of two outputs from said first delay unit and a subtraction unit in a predetermined order;
- a second butterfly operation unit for performing a butterfly operation for the output of said first selector;
- a third resequence unit for resequencing the order of the output of said second butterfly operation unit;
- a second delay unit for delaying an output of said third resequencing unit by a predetermined period of time;
- a second selector unit for selecting one of two outputs from said second delay unit and said subtraction unit;
- a third butterfly operation unit for performing a butterfly operation for an output of said second selector;
- a fourth resequence unit for resequencing the order of output of said third butterfly operation unit into a predetermined order to output an orthogonal transformed signal;
- a third selector unit for selecting one of two outputs from said second and third resequence units in a predetermined order;
- a multiplication unit for multiplying an output of said third selector by a multiplier selected in a predetermined order; and
- a fourth selector unit for selecting one of two outputs from said second and third resequence units in a predetermined order;
- said subtraction unit being adapted to subtract the output of said fourth selector from the output of said multiplication unit.

8. An orthogonal transformation apparatus as defined in claim 7 in which said delay units and selector units comprise memories and control means for said memories.

* * * * *